(12) United States Patent
Inada et al.

(10) Patent No.: US 8,253,961 B2
(45) Date of Patent: Aug. 28, 2012

(54) PRINTER AND PRINTER CONTROL METHOD

(75) Inventors: Hironobu Inada, Matsumoto (JP); Akihiro Ikeda, Toumi (JP); Masanori Zama, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 644 days.

(21) Appl. No.: 12/363,602

(22) Filed: Jan. 30, 2009

(65) Prior Publication Data

US 2009/0190173 A1    Jul. 30, 2009

(30) Foreign Application Priority Data

Jan. 30, 2008  (JP) ................................. 2008-018652
Jan. 30, 2008  (JP) ................................. 2008-018653

(51) Int. Cl.
   *G06F 3/12* (2006.01)
(52) U.S. Cl. ...................... 358/1.15; 358/1.13; 358/1.16; 347/171; 400/76; 400/149; 400/188; 400/189
(58) Field of Classification Search ........................ None
See application file for complete search history.

(56) References Cited

U.S. PATENT DOCUMENTS

| | | | | |
|---|---|---|---|---|
| 5,206,684 | A * | 4/1993 | Wada et al. ......................... | 399/1 |
| 5,670,995 | A * | 9/1997 | Kupcho et al. ...................... | 347/5 |
| 5,999,710 | A * | 12/1999 | Smith et al. .................... | 358/1.15 |
| 7,912,396 | B2 * | 3/2011 | Park ................................. | 399/85 |

| | | | | |
|---|---|---|---|---|
| 2005/0146739 | A1 * | 7/2005 | Rayl et al. ..................... | 358/1.13 |
| 2007/0273744 | A1 * | 11/2007 | Yamada et al. ................ | 347/204 |
| 2007/0280767 | A1 * | 12/2007 | Iwasaki ........................... | 400/76 |

FOREIGN PATENT DOCUMENTS

| | | |
|---|---|---|
| JP | 59-068268 A | 4/1984 |
| JP | 03-027434 A | 2/1991 |
| JP | 03-234560 A | 10/1991 |
| JP | 04-001067 A | 1/1992 |
| JP | 2004-058488 A | 2/2004 |
| JP | 2007-320087 A | 12/2007 |
| JP | 2008-006802 A | 1/2008 |

* cited by examiner

*Primary Examiner* — Marivelisse Santiago Cordero
*Assistant Examiner* — Miya J Cato
(74) *Attorney, Agent, or Firm* — Kilpatrick Townsend & Stockton LLP

(57) ABSTRACT

A thermal printer and a control method for a thermal printer enable increasing throughput before a printing process starts by starting a duplex printing process without waiting to convert all print data into the front print buffer and back print buffer, enable executing a duplex printing process on a print medium without using a front print buffer and a separate back print buffer, and enable switching between simplex printing and duplex printing according to a specific command. The control method includes a step S11 of receiving a printing process selection command specifying execution of a simplex printing process on a front side 301 of the print medium, a simplex printing process on a back side 302 of the print medium, a duplex printing process that prints on the front side 301 and the back side 302, and an identical front/back printing process that prints the same print data on the front side 301 and back side 302, a step S14 of converting and buffering the print data, and a step S19 of executing the printing process specified by the printing process selection command.

8 Claims, 9 Drawing Sheets

PRINTER AND PRINTER CONTROL METHOD

CROSS-REFERENCES TO RELATED APPLICATIONS

This application claims priority to Japanese Patent Application No. 2008-018652, filed Jan. 30, 2008 and to Japanese Patent Application No. 2008-018653, filed Jan. 30, 2008. the entire disclosures of which are expressly incorporated by reference herein.

BACKGROUND OF THE INVENTION

1. Technical Field

The present invention relates to a printer that executes a printing process on one side or both sides of a print medium, and to a control method for the printer.

2. Related Art

A thermal printer that prints the same content to two print media is known from the literature. See, for example, Japanese Unexamined Patent Appl. Pub. JP-A-H03-027434. JP-A-H03-027434 teaches a printer that advances receipt paper and journal paper, which are the two print media, by rotation of the paper feed roller with the print media in contact with the thermal head. By applying the same control signal to the heating resistors on two sides of the thermal head, the heating elements corresponding to the heating resistors are selectively caused to heat simultaneously and print the same print image to both the receipt paper and the journal paper.

Japanese Unexamined Patent Appl. Pub. JP-A-H04-001067 teaches a dot printer that disposes print heads on opposite sides of a single print medium and prints the same pattern from both sides. With the dot printer taught in JP-A-H04-001067, print heads having a plurality of printing wires are disposed opposite each other, and simultaneously print the same dot pattern from the front and back sides of the print medium conveyed between the two print heads. The force of impact of the printing wires of the print heads that print to the printing paper through an intervening ink ribbon is greater than the impact force of the printing wires of the print head that prints directly on the back side of the printing paper. This configuration improves copy performance and prevents damage to the printing paper.

Thermal printers that print on both front and back sides of a continuous print medium such as roll paper used for printing receipts are also known from the literature. See, for example, Japanese Unexamined Patent Appl. Pub. JP-A-S59-068268, Japanese Unexamined Patent Appl. Pub. JP-A-H03-0234560, Japanese Unexamined Patent Appl. Pub. JP-A-2007-320087, and Japanese Unexamined Patent Appl. Pub. JP-A-2008-006802. Duplex printing normally requires the printer to have at least a front print buffer to which data printed to the front (or first) side is buffered, and a back print buffer to which data printed to the back (or second) side is buffered. The print data is appropriately converted and written to the front print buffer and the back print buffer, and the printing process starts after the data required to print the front and back sides in a duplex printing mode has been buffered.

Japanese Unexamined Patent Appl. Pub. JP-A-2004-058488 teaches an inkjet printer that has a front print buffer and back print buffer and prints both sides in a duplex printing mode.

Print data is thus normally converted into the front print buffer to print on the front side of the print medium, and is converted into the back print buffer to print on the back side of the print medium. To print both sides simultaneously, the print data for both front and back sides is first written to the print buffers before printing starts. More buffer capacity is therefore required than a thermal printer that prints only one side.

Furthermore, when the start of printing is delayed until all of the print data has been written to the front and back print buffers, throughput before printing starts drops compared with when only one side is printed. More particularly, the same print data must be written to both the front print buffer and the back print buffer if the same content is to be printed on both front and back sides. However, if the time required to convert the same print data to both buffers can be shortened, throughput before printing starts can be further increased.

SUMMARY

A printer and a printer control method according to at least one embodiment of the present invention are directed to solving the foregoing problems and increasing throughput before printing starts by starting the duplex printing process without waiting for all print data to be converted and written to the front print buffer and back print buffer.

A printer according to another aspect of the present invention can print in a duplex printing mode on both sides of the recording medium without having separate front and back print buffers, and can switch in response to a predetermined command between a simplex printing process and duplex printing process. The print data conversion time can also be shortened and throughput before the printing process starts can be increased when the same content is to be output to both front and back sides of the print medium.

A first aspect of the invention is a printer for executing a printing process on one side or both sides of a print medium, the printer having a data conversion area having sufficient storage capacity to execute a printing process on at least one side of the print medium; a reception unit that receives the print data and a printing process selection command specifying execution of a simplex printing process that prints the print data written to the data conversion area to a first side of the print medium, a simplex printing process that prints the print data written to the data conversion area to a second side of the print medium, a duplex printing process that prints different print data written to the data conversion area to the first side and the second side of the print medium, and a duplex printing process that prints the same print data written to the data conversion area to the first side and the second side of the print medium; and a printing control unit that executes the printing process specified by the printing process selection command.

Another aspect of the invention is a control method for a printer that has a data conversion area having sufficient storage capacity to execute a printing process on at least one side of a print medium, and executes the printing process on one side or both sides of the print medium, the control method including steps of: receiving a print data and a printing process selection command specifying execution of a simplex printing process that prints the print data written to the data conversion area to a first side of the print medium, a simplex printing process that prints the print data written to the data conversion area to a second side of the print medium, a duplex printing process that prints different print data written to the data conversion area to the first side and the second side of the print medium, and a duplex printing process that prints the same print data written to the data conversion area to the first side and the second side of the print medium; converting and writing the print data into the data conversion area; and executing the printing process specified by the printing process selection command.

At least one embodiment of the invention thus enables executing a simplex printing process on the first side of a print medium, a simplex printing process on the second side of the print medium, a duplex printing process, or an identical front/back printing process.

Preferably, the data conversion area of the printer includes a first data conversion area to which the print data printed on the first side is buffered, and a second data conversion area to which the print data printed on the second side is buffered, and the printing control unit changes the data conversion area and converts the print data according to each printing process selection command, and executes the duplex printing process based on the print data written to the first data conversion area and second data conversion area when triggered by a print opportunity.

In the control method for a printer according to at least one embodiment of the present invention, the data conversion area preferably includes a first data conversion area to which the print data printed on the first side is buffered, and a second data conversion area to which the print data printed on the second side is buffered, and the control method also includes steps of changing the data conversion area and converting the print data according to each printing process selection command, and executing the duplex printing process based on the print data written to the first data conversion area and second data conversion area when triggered by a print opportunity.

In this aspect of the invention the data conversion area is switched between the first data conversion area and second data conversion area with each printing process selection command, and the print data is converted and written to the corresponding data conversion area. The data conversion area to which the print data is written can be changed according to the printing process selection command. For example, if a simplex printing process on the first side of the print medium is selected, the print data is written to the first data conversion area, and when a simplex printing process on the second side is then selected, the data conversion area is changed from the first data conversion area to the second data conversion area and the print data is written to the selected data conversion area. When simplex printing on the first side is again selected, the data conversion area is switched from the second data conversion area to the first data conversion area, and the print data is written to the first data conversion area.

If the data conversion area can be switched by the printing process selection command at each print line, the print data for one line on the first side can be written to the first data conversion area, and the print data for the second side can then be written to the second data conversion area. It is therefore possible to start the duplex printing process after at least one line of print data has been written to the first data conversion area and the second data conversion area, and it is not necessary to wait for all print data to be written to the front print buffer and back print buffer as it is in the related art. Throughput before the printing process starts can therefore be improved.

In a printer according to another aspect of the invention the printing control unit sets the data conversion area to the first data conversion area for print data conversion when a simplex printing process on the first side is selected, sets the data conversion area to the second data conversion area for print data conversion when a simplex printing process on the second side is selected, and executes the duplex printing process triggered by a full buffer state as the print opportunity when the data conversion area corresponding to the side selected by the printing process selection command becomes full.

This aspect of the invention starts the duplex printing process when the print data buffer indicated by the printing process selection command becomes full. Therefore, if the data conversion area can be switched by the printing process selection command at each print line, the print data for one line on the first side can be written to the first data conversion area, the print buffer can then be changed, and the print data for the second side can then be written to the second data conversion area. The printing process then starts when the selected second data conversion area (print buffer) becomes full. It is therefore possible to execute the duplex printing process line by line triggered by a full buffer state if the first data conversion area and second data conversion area each have enough capacity to store at least one line of print data.

In a printer according to another aspect of the invention the printing control unit writes print data to the first data conversion area and the second data conversion area when the duplex printing process is selected, and executes the duplex printing process triggered by a full buffer state as the print opportunity when the data conversion area including both the first data conversion area and the second data conversion area becomes full.

This aspect of the invention starts the duplex printing process when the data conversion area including both the first data conversion area and the second data conversion area becomes full. Therefore, if the data conversion area can be switched by the printing process selection command line by line, the print data for one line on the first side can be written to the first data conversion area, the print data for the second side can then be written to the second data conversion area, and the printing process starts after the data conversion area including both the first data conversion area and the second data conversion area becomes full. As a result, if the first data conversion area and second data conversion area each have enough capacity to store at least one line of print data, the duplex printing process can be executed line by line triggered by a full buffer state after converting print data for a maximum of two lines.

In a printer according to another aspect of the invention the printing control unit preferably executes the duplex printing process triggered by a line feed command specifying changing the line on which the print data is printed as the print opportunity.

With this aspect of the invention printing is triggered by both a full print buffer state and by detection of a line feed command. The printing process can therefore be executed without waiting for the print buffer to become full by inserting a line feed command at the desired position in the print data. Content having line feeds inserted at the line count desired by the user can therefore be printed.

In a printer according to another aspect of the invention the printing control unit simultaneously prints identical content to the first side and the second side based on the print data written to the data conversion area when the identical front/back printing process is specified, simplex prints to the first side of the print medium based on the print data written to the data conversion area when the simplex printing process on the first side is specified, and simplex prints to the second side of the print medium based on the print data written to the data conversion area when the simplex printing process on the second side is specified.

When the identical front/back printing process is selected in this aspect of the invention, the same content is printed simultaneously to the first side and the second side of the print medium. The same content can thus be printed on both front and back sides of the print medium while using a smaller data conversion area and achieving at least the same printing speed enabled by the related art.

Furthermore, when a printing process on the first side or a printing process on the second side is specified, simplex printing on the selected first side or second side can be executed based on the print data written to the data conversion area. The data conversion area can therefore be used for both the front printing process and back printing process, and it is not necessary to provide a front print buffer and a separate back print buffer as required by the related art.

When the storage capacity of the data conversion area becomes full in a printer according to another aspect of the invention, the printing control unit starts the printing process triggered by the full buffer state.

This aspect of the invention starts the printing process when the data conversion area becomes full. As described above, the storage capacity of the data conversion area only needs to be enough to execute a simplex printing process. The printing process can therefore be executed triggered by print opportunities at the same interval as in at least a simplex printing process. One or both sides of the print medium can therefore be printed with a printing speed that is at least equal to the printing speed of a simplex printing process according to the related art.

Other objects and attainments together with a fuller understanding of the invention will become apparent and appreciated by referring to the following description and claims taken in conjunction with the accompanying drawings.

DESCRIPTION OF EMBODIMENTS

Embodiment 1

At least one embodiment of the present invention is described below with reference to the accompanying figures.

Figure 1:
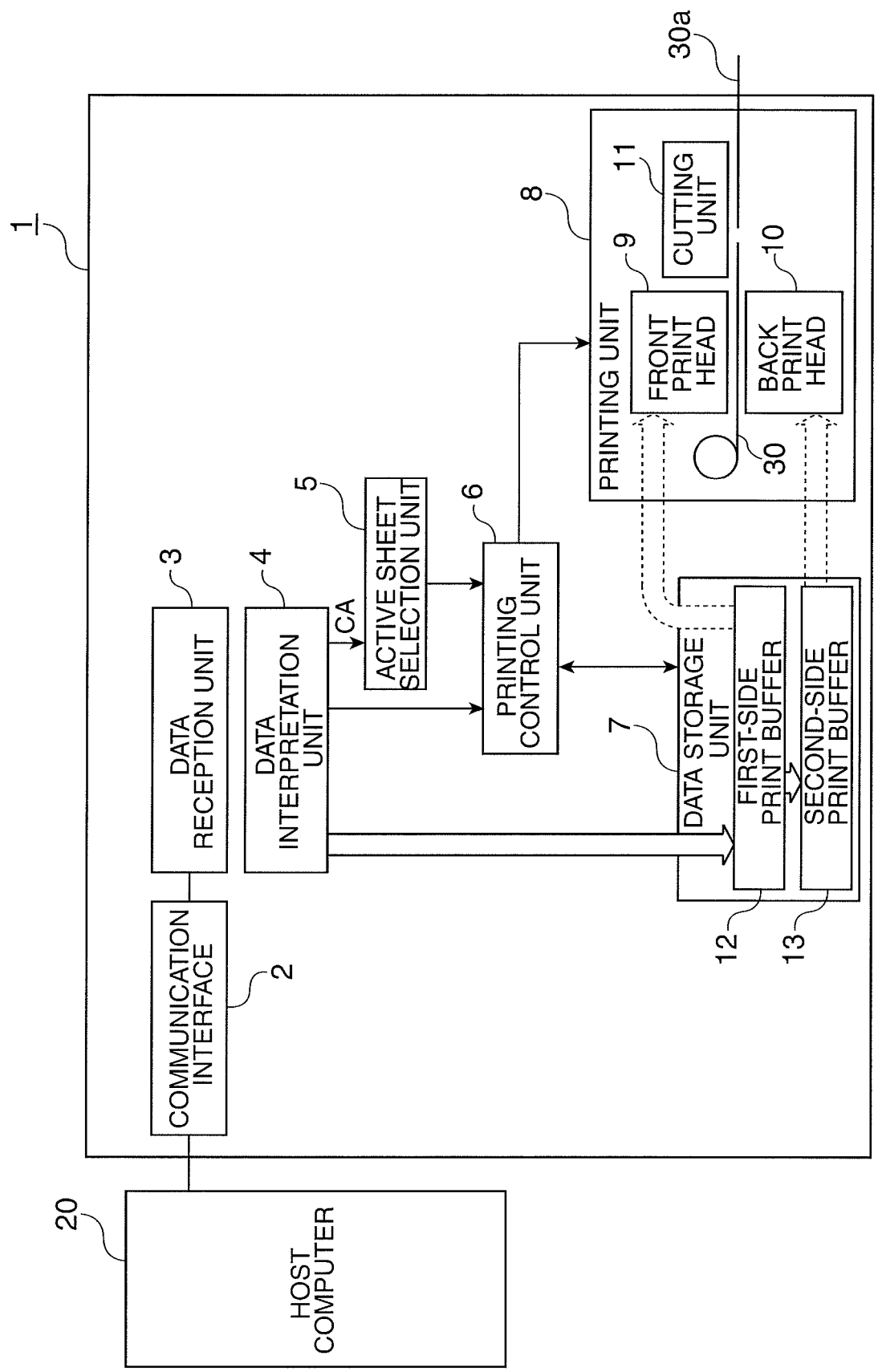
FIG. 1 is a schematic block diagram of a thermal printer according to a first embodiment of the invention.

FIG. 1 is a schematic block diagram of a thermal printer according to a first embodiment of the invention. As shown in FIG. 1, a printer 1 according to this embodiment of the invention is a thermal printer that receives print data sent from a host computer 20 and prints on one side or both sides of a continuous recording medium (print medium) such as roll paper.

The major parts of a printer 1 according to this embodiment of the invention include a communication interface 2, a data reception unit 3, a data interpretation unit 4, an active sheet selection unit 5, a printing control unit 6, a data storage unit 7, and a printing unit 8.

The data reception unit 3 receives print data sent from a host computer 20 and inputs the received print data to the data interpretation unit 4. The data interpretation unit 4 then interprets the received print data, and if a printing process selection command CA (printing process selection instruction) is contained in the print data, inputs the command to the active sheet selection unit 5. If a cut command or line feed command, for example, is also found as a result of interpreting the print data, the detected command is input to the printing unit 8 through the printing control unit 6.

When the printing process selection command CA is input from the data interpretation unit 4, the active sheet selection unit 5 selects the specified printing process. More specifically, if the front side of the roll paper is set by the printing process selection command CA as the active sheet, a front printing process is selected. If the back side of the roll paper is roll paper is set as the active sheet, a back printing process is selected. If both the front and back sides of the roll paper are set as the active sheets, a duplex printing process is selected.

The data storage unit 7 (data conversion area) is RAM or other type of volatile memory. A first-side print buffer 12 (first conversion area) to which the print data to be printed on the front side of the roll paper 30 is converted, and a second-side print buffer 13 (second conversion area) to which the print data to be printed on the back side of the roll paper 30 is converted, are reserved in the data storage unit 7. If the result of data analysis by the data interpretation unit 4 is that print data other than a command is detected, the print data is converted into the appropriate data print buffers 12 and 13. Note that each of the print buffers 12 and 13 in this embodiment of the invention has the capacity to store at least one line of print data. If the printing processes are to execute continuously, a storage capacity of two or more lines is required.

The printing control unit 6 controls the printing unit 8. Based on the printing process selected by the printing process selection command CA, the printing control unit 6 switches the data conversion area to either the first-side print buffer 12 or the second-side print buffer 13 and converts the print data. When there is an opportunity to print, the duplex printing mode is executed based on the data written to the first-side print buffer 12 or second-side print buffer 13. More specifically, if the front printing process is selected, the data conversion area is set to the first-side print buffer 12 and the print data is converted. If the back printing process is selected, the data conversion area is set to the second-side print buffer 13 and the print data is converted. If the front and back printing processes are selected, the print data is converted and written appropriately to the first-side print buffer 12 and the second-side print buffer 13.

If another printing process selection command CA is not received between when the front printing process is selected and a print opportunity occurs, the print data is written only to the first-side print buffer 12 and the front printing process (simplex printing) executes. Likewise, if another printing process selection command CA is not received between when the back printing process is selected and a print opportunity occurs, the print data is written only to the second-side print buffer 13 and the back printing process (simplex printing) executes.

In addition, if another printing process selection command CA is not received between when the front and back printing process is selected and a print opportunity occurs, the print data is written to the first-side print buffer 12 and the second-side print buffer 13 and the duplex printing process executes.

If the selected print buffer becomes full, this full buffer state causes the printing control unit 6 to control the printing unit 8 to start the printing process. Detection of a line feed command for printing the print data on the next line also causes the printing control unit 6 to control the printing unit 8 to start printing.

The printing unit 8 prints on the roll paper 30 in either the simplex printing mode or duplex printing mode according to the command from the printing control unit 6. The printing unit 8 has two print heads disposed on opposite sides of the roll paper 30, and a cutting unit 11 for cutting the roll paper 30. The front print head 9 prints on the front side 301 (first side) of the roll paper 30, and the back print head 10 prints on the back side 302 (second side) of the roll paper 30.

Both print heads 9 and 10 are line thermal print heads. When one line of the print head is printed, the roll paper 30 is advanced the distance equal to one line in the paper transportation direction X (see FIG. 3). Both sides of the roll paper 30 are printed simultaneously and continuously by repeating the operations of printing and advancing the paper one line at a time.

In the simplex printing mode, one of the print heads 9 and 10 is driven to print the corresponding side.

The roll paper 30 is thermal paper in this embodiment of the invention. The roll paper 30 is a web of paper wound into a tubular roll and is loaded into the printing unit 8 for use. When simplex printing or duplex printing on the roll paper 30 is completed, the printing control unit 6 controls the cutting unit 11 to cut the roll paper 30.

The printing process of the printer 1 according to this embodiment of the invention is described next.

As described above, when a printing process selection command CA is sent from the host computer 20, the active sheet selection unit 5 in this embodiment of the invention selects the specified printing process. The duplex printing process executed by the printer 1 when the host computer 20 sends print data containing a front-side selection command and a back-side selection command, which are printing process selection commands CA, to the printer 1 is described below. As a variation of this embodiment, the duplex printing process executed by the printer 1 when the host computer 20 sends print data containing a front and back selection command as the printing process selection command CA is also described below.

Duplex Printing while Switching the Active Sheet Between Front and Back

Figure 2:
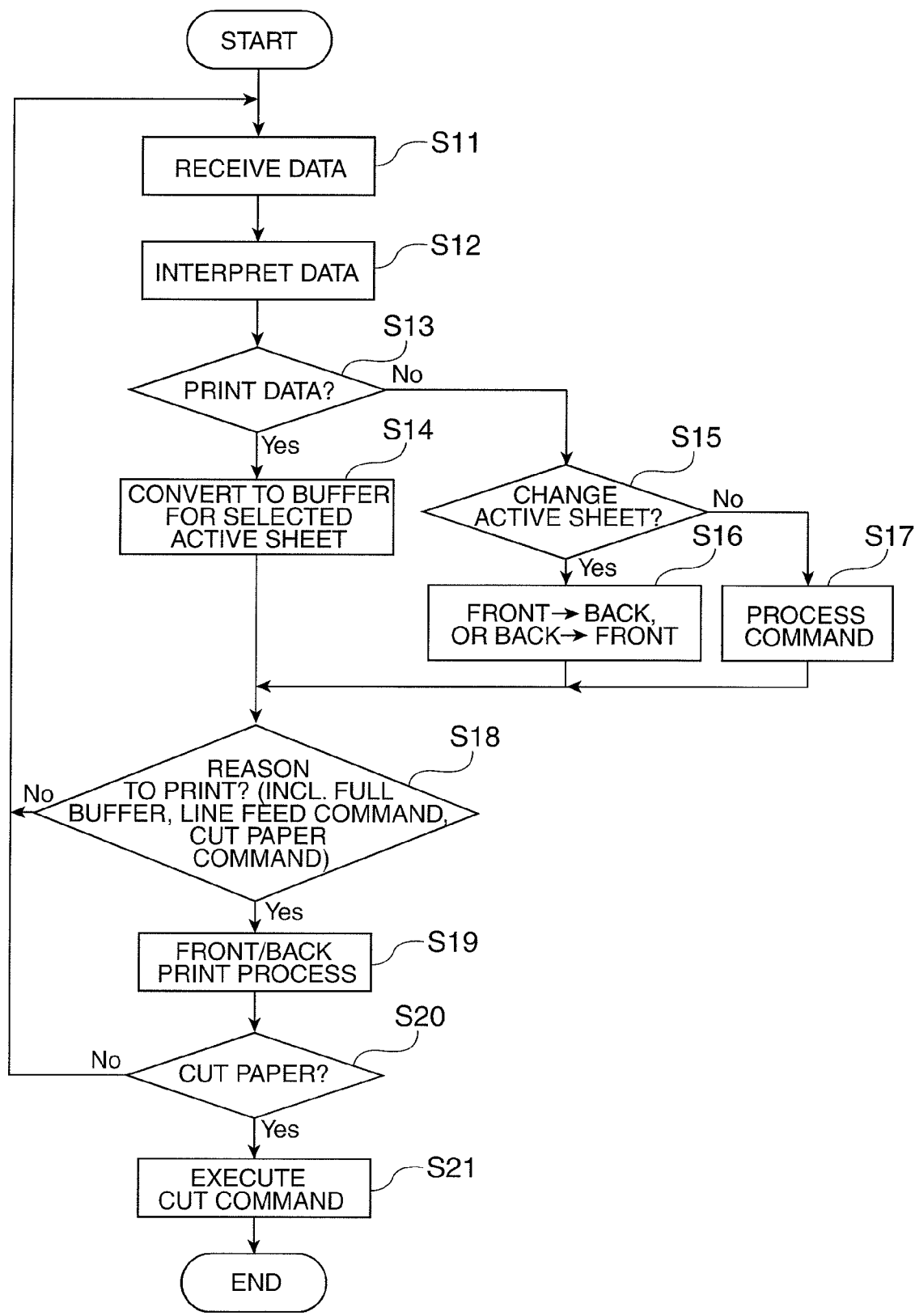
FIG. 2 is a flow chart of the printing process executed by the printer according to the first embodiment of the invention.
Figure 3:
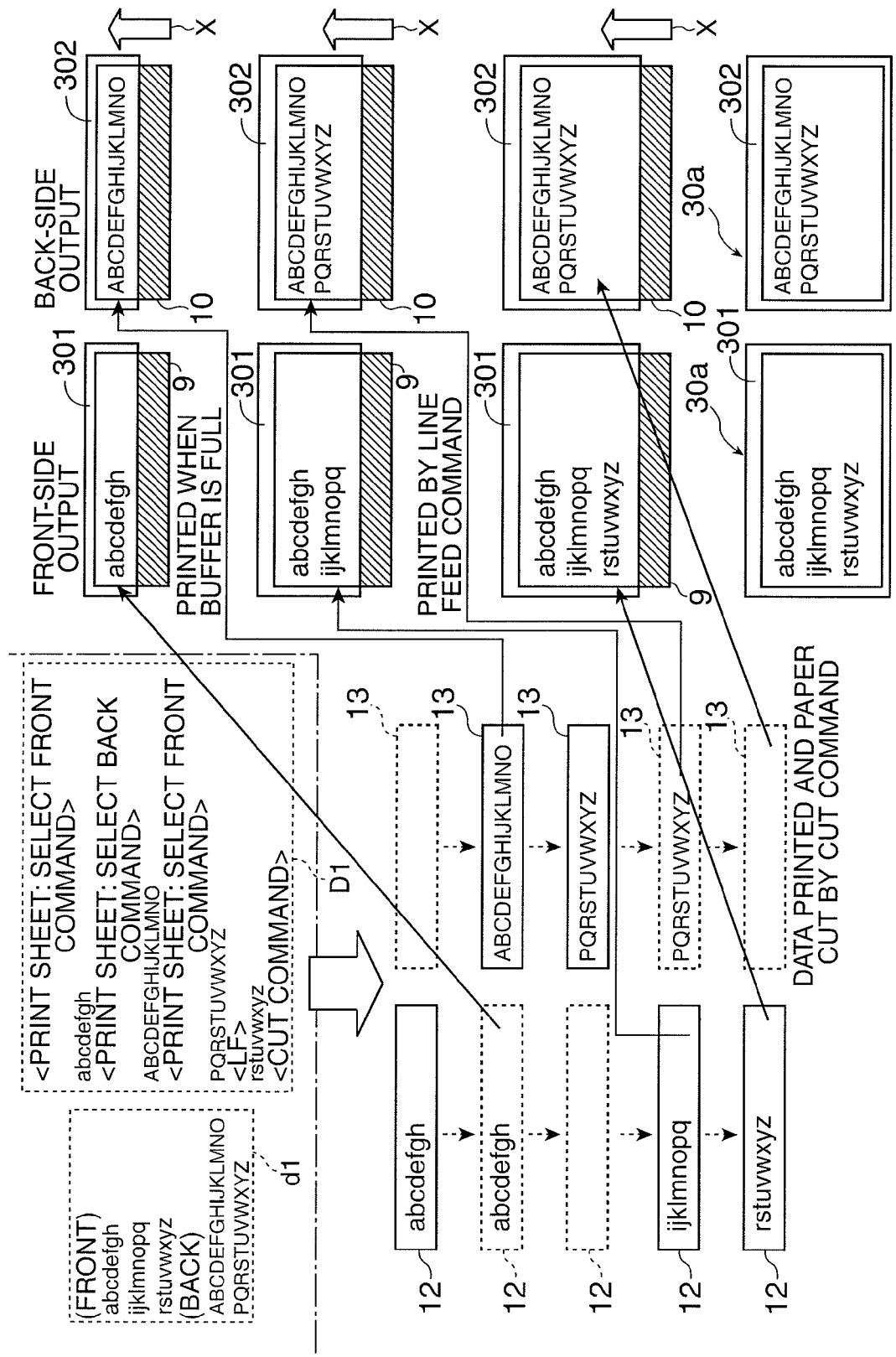
FIG. 3 schematically describes execution of the data conversion process and the printing process when the printer according to the first embodiment executes the duplex printing process.

FIG. 2 is a flow chart of the printing process executed by the printer according to the first embodiment of the invention. FIG. 3 schematically describes execution of the data conversion process and the printing process when the printer according to the first embodiment executes the duplex printing process.

In this embodiment of the invention the print information d1 created by a host application is converted on the host computer 20 side to print data D1 for the printer 1. The printer 1 then executes the printing process based on this converted print data D1.

When the data reception unit 3 receives print data D1 containing a printing process selection command CA from the host computer 20 (step S11), the data interpretation unit 4 interprets the print data D1 (step S12). If the data interpretation unit 4 detects a printing process selection command CA as a result of interpreting the print data D1 (step S13 returns No, step S15 returns Yes), the command is input to the active sheet selection unit 5. The active sheet selection unit 5 then selects the active sheet specified by the printing process selection command CA.

If the front side of the roll paper is selected as the active sheet, the front printing process is selected as the printing process, and the printing control unit 6 selects the print buffer corresponding to the selected active sheet. If the second-side print buffer 13 is already set in this situation, the data conversion area is switched to the first-side print buffer 12 (step S16). If the active sheet is set to the back side, the back printing process is selected as the printing process. If the first-side print buffer 12 is already set in this situation, the data conversion area is switched to the second-side print buffer 13 (step S16).

Because the front-side selection command is contained at the beginning of the print data D1 in this example, the active sheet selection unit 5 selects the front printing process.

If the data interpreted by the data interpretation unit 4 does not trigger printing (step S18 returns No), interpreting the print data D1 continues. If print data other than a command is then detected (step S13 returns Yes), the print data is converted in the print buffer corresponding to the active sheet selected in step S16. As shown in FIG. 3, the print data [abcdefgh] sent from the host computer 20 is converted into the first-side print buffer 12 (step S14). If the first-side print buffer 12 is not full and a line feed command LF triggering printing is not received, control returns to step S11 (step S18 returns No).

If the data interpretation unit 4 detects a printing process selection command CA as a result of interpreting the print data D1 (step S13 returns No, step S15 returns Yes), the command is input to the active sheet selection unit 5. The active sheet selection unit 5 then selects the active sheet specified by the printing process selection command CA. Because the next printing process selection command contained in the print data D1 is a back-side selection command, the active sheet selection unit 5 selects the back printing process and the printing control unit 6 changes the print buffer, which is currently set to the first-side print buffer 12, to the second-side print buffer 13 (step S16).

If print data other than a command is then detected (step S13 returns Yes) as a result of the data interpretation unit 4 interpreting the print data D1, the print data is converted into the second-side print buffer 13. As shown in FIG. 3, the print data [ABCDEFGHIJKLMNO] sent from the host computer 20 is converted into the second-side print buffer 13 (step S14). If the second-side print buffer 13 is full, the full buffer state triggers printing (step S118 returns Yes), and the printing control unit 6 runs the simultaneous duplex printing mode to print the front print data [abcdefgh] to the front side 301 of the roll paper by means of the front print head 9 and print the back print data [ABCDEFGHIJKLMNO] to the back side 302 of the roll paper by means of the back print head 10 (step S19).

Interpreting and converting the print data continues until the data interpretation unit 4 detects a cut command (step S20 returns No). If print data other than a command is then detected (step S13 returns Yes) as a result of the data interpretation unit 4 continuing interpreting the print data D1, the print data is converted into the corresponding print buffer. The print buffer to which the converted data is written remains set to the second-side print buffer 13 and is not changed at this time because the active sheet selection unit 5 previously selected the back printing process. As shown in FIG. 3, the print data [PQRSTUVWXYZ] sent from the host computer 20 is converted to the second-side print buffer 13 (step S14). If the second-side print buffer 13 is not full and a line feed command LF is not received, control returns to step S11 (step S18 returns No).

If the data interpretation unit 4 detects a printing process selection command CA as a result of interpreting the print data D1 (step S15 returns Yes), the command is input to the active sheet selection unit 5. The active sheet selection unit 5 then selects the active sheet specified by the printing process selection command CA. Because the next printing process selection command contained in the print data D1 is a front-side selection command, the active sheet selection unit 5 selects the front printing process.

The printing control unit 6 then changes the print buffer to the first-side print buffer 12 according to the front printing process selected by the active sheet selection unit 5 (step S16). As shown in FIG. 3, the print data [ijklmnopq] sent next from the host computer 20 is then written to the first-side print buffer 12 (step S14). Even though the first-side print buffer 12 is not full, the line feed command LF following the print data [ijklmnopq] triggers printing (step S18 returns Yes), the front print head 9 prints the print data [ijklmnopq] to the front side 301 of the roll paper and the back print head 10 prints the print data [PQRSTUVWXYZ] to the back side 302 of the roll paper in the duplex printing process (step S19).

Interpreting and converting the print data thus continues until the data interpretation unit 4 detects a cut command (step S20 returns No). If print data other than a command is then detected as a result of the data interpretation unit 4 continuing interpreting the print data D1, the print data is converted into the corresponding print buffer. The print buffer to which the converted data is written remains set to the first-side print buffer 12 and is not changed at this time because the active sheet selection unit 5 previously selected the front printing process. As shown in FIG. 3, the print data [rstuvwxyz] sent from the host computer 20 is converted to the first-side print buffer 12 (step S14).

Even though the first-side print buffer 12 is not full, the line feed command LF following the print data [rstuvwxyz] triggers printing (step S18 returns Yes), and the front print head 9 and back print head 10 are driven to simultaneously print both sides (step S19). Because there is no print data in the second-side print buffer 13 at this time, the print data [rstuvwxyz] is printed to the front side 301 by the front print head 9.

When the data interpretation unit 4 detects the cut command at the end of the print data D1 (step S20 returns Yes), the printing control unit 6 drives the cutting unit 11 to cut the roll paper 30 (step S21).

Duplex printing that switches the active sheet between the front and back sides is thus executed as described above, but if the print buffer selected by the printing process selection command CA becomes full, the full buffer state triggers the duplex printing process. More specifically, if the front printing process is selected by the front-side selection command and the first-side print buffer 12 becomes full, the full buffer state triggers execution of the duplex printing process. Likewise, if the back printing process is selected by the back-side selection command and the second-side print buffer 13 becomes full, the full buffer state triggers execution of the duplex printing process.

Therefore, if the print buffer is switched line by line as described in the embodiment above, one line of print data to be printed on the front side 301 of the roll paper is written to the first-side print buffer 12, the data conversion area (buffer) is then changed and one line of print data to be printed on the back side 302 is written to the second-side print buffer 13, and printing starts when the selected second-side print buffer 13 becomes full. Therefore, if the first-side print buffer 12 and second-side print buffer 13 each have capacity sufficient to store one line of print data, the duplex printing process can be executed line by line each time the print buffer becomes full.

Figure 4:
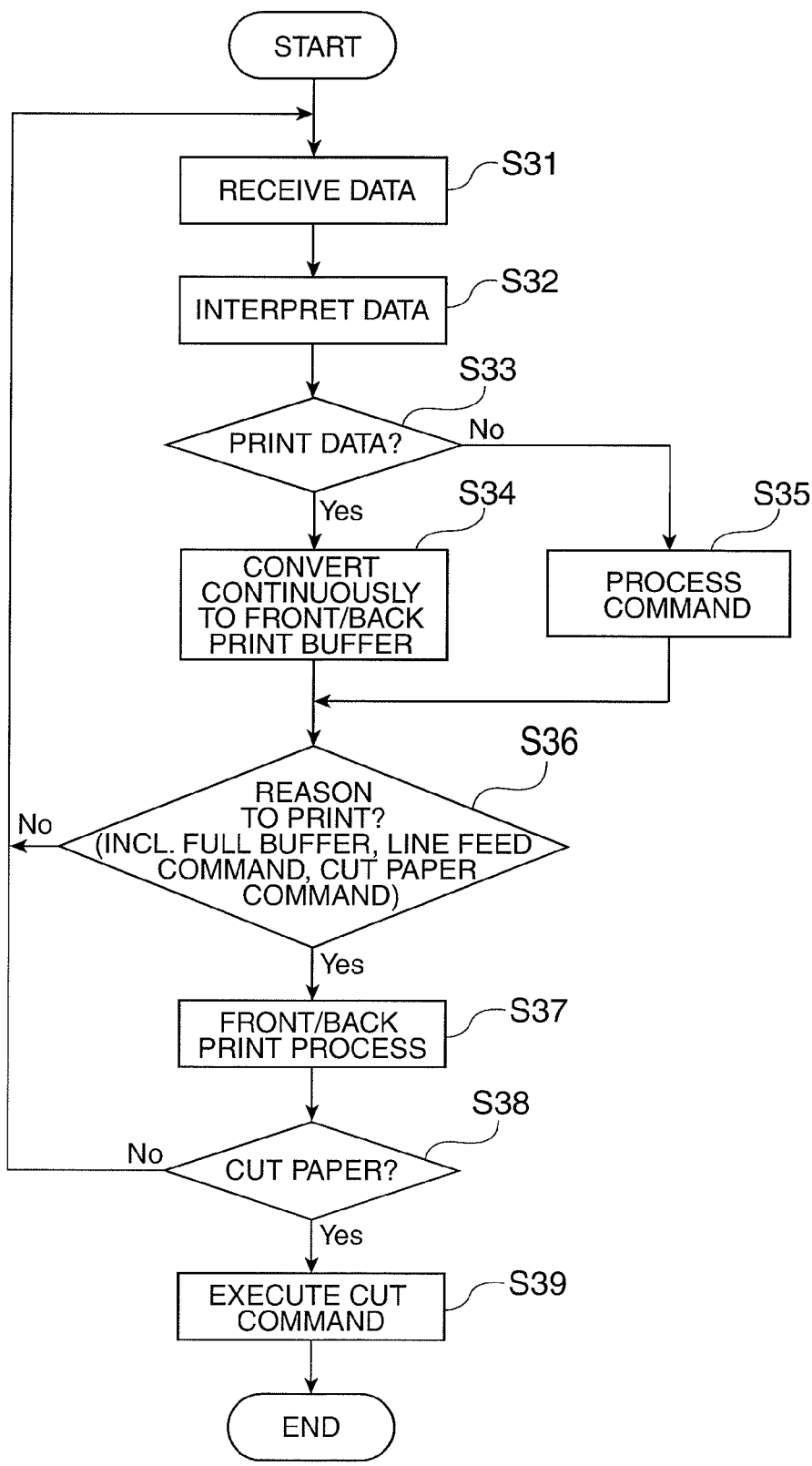
FIG. 4 is a flow chart describing a variation of the printing process executed by the printer according to the first embodiment of the invention.
Figure 5:
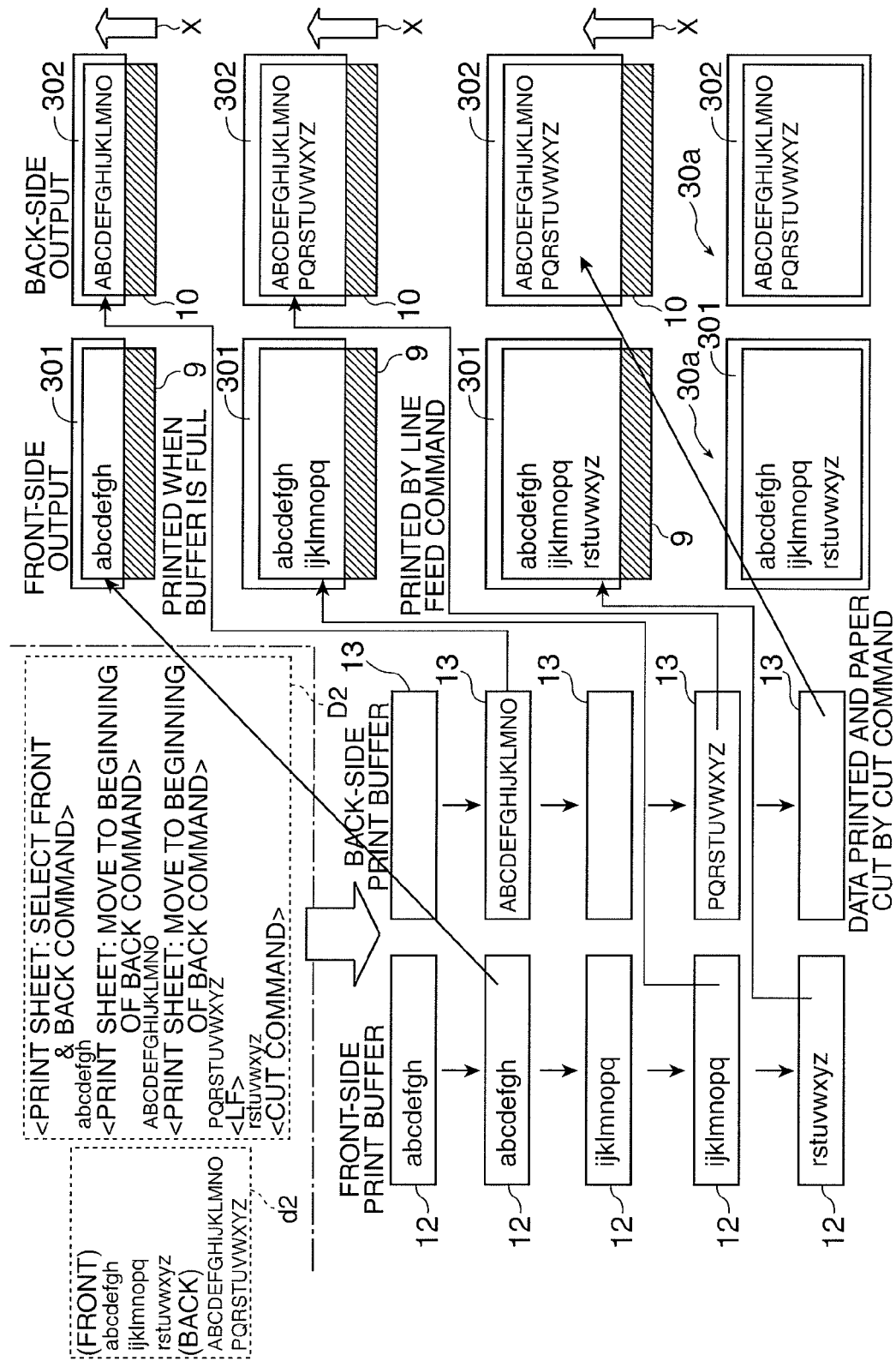
FIG. 5 schematically describes execution of the data conversion process and the printing process when the printer according to the first embodiment executes a variation of the duplex printing process.

Variation: Duplex Printing when Front and Back Sides are Selected as the Active Sheet The duplex printing process executed by the printer 1 when print data containing front and back selection commands is sent to the printer 1 is described next with reference to FIG. 4 and FIG. 5. FIG. 4 is a flow chart describing a variation of the printing process executed by the printer according to the first embodiment of the invention. FIG. 5 schematically describes execution of the data conversion process and the printing process when the printer according to the first embodiment executes a variation of the duplex printing process.

In this embodiment of the invention the print information d2 created by a host application is converted on the host computer 20 side to print data D2 for the printer 1. The printer 1 then executes the printing process based on this converted print data D2.

When the data reception unit 3 receives print data D2 containing a printing process selection command CA from the host computer 20 (step S31), the data interpretation unit 4 interprets the print data D2 (step S32). If the data interpretation unit 4 detects a printing process selection command CA as a result of interpreting the print data D2 (step S33 returns No), the command is input to the active sheet selection unit 5. The active sheet selection unit 5 then selects the active sheet specified by the printing process selection command CA.

Because the front and back selection command is contained at the beginning of the print data D2 in this example, the active sheet selection unit 5 selects the duplex printing process. Because the active sheet selection unit 5 selects the duplex printing process, the printing control unit 6 sets the data conversion area to both the first-side print buffer 12 and second-side print buffer 13.

If the data interpretation unit 4 detects print data other than a command as a result of interpreting the print data D2 (step S33 returns Yes), the print data is converted to the corresponding print buffer. As shown in FIG. 5, the print data [abcdefgh] sent first from the host computer 20 is converted into the first-side print buffer 12 (step S34). If the first-side print buffer 12 is not full and a line feed command LF triggering printing is not received, control returns to step S21 (step S36 returns No) because there is no reason to print.

If as a result of interpreting the print data D2 the data interpretation unit 4 detects a command instructing writing the next line of print data from the beginning of the second-side print buffer 13 (a move-to-start-of-back-side command) (step S33 returns No), the active sheet selection unit 5 sets the data conversion area to the second-side print buffer 13 (step S35). The print data [ABCDEFGHIJKLMNO] is then written to the second-side print buffer 13 (step S34). If the second-side print buffer 13 is full, the full buffer state causes the printing control unit 6 to start printing (step S36 returns Yes) to print the front print data [abcdefgh] to the front side 301 of the roll paper by means of the front print head 9 and print the back print data [ABCDEFGHIJKLMNO] to the back side 302 of the roll paper by means of the back print head 10 in the duplex printing process (step S37).

Interpreting and converting the print data continues until the data interpretation unit 4 detects a cut command (step S38 returns No). If print data other than a command is then detected (step S33 returns Yes as a result of the data interpretation unit 4 continuing interpreting the print data D2, the print data is converted into the corresponding print buffer. The printing control unit 6 sets the print buffer to which the converted data is written is set to the first-side print buffer 12 at this time because the active sheet selection unit 5 has selected the duplex printing process. As shown in FIG. 5, the print data [ijklmnopq] received next from the host computer 20 is written to the first-side print buffer 12 (step S34). If a line feed command LF triggering printing is not received, there is no reason to start printing and control returns to step S32 (step S36 returns No).

If as a result of interpreting the print data D2 the data interpretation unit 4 detects a command instructing writing the next line of print data from the beginning of the second-side print buffer 13 (a move-to-start-of-back-side command) (step S33 returns No), the active sheet selection unit 5 changes the data conversion area from the first-side print buffer 12 to the second-side print buffer 13 (step S35).

The print data [ABCDEFGHIJKLMNO] received next is then written to the second-side print buffer 13 (step S34). The line feed command LF following the print data [PQRSTU-VWXYZ] then causes the printing control unit 6 to start printing (step S36 returns Yes) to print the front print data [ijklmnopq] to the front side 301 of the roll paper by means of the front print head 9 and print the back print data [PQRSTU-VWXYZ] to the back side 302 of the roll paper by means of the back print head 10 in the duplex printing process (step S37).

Interpreting and converting the print data continues until the data interpretation unit 4 detects a cut command (step S38 returns No). If as a result of the data interpretation unit 4 continuing interpreting the print data D2 (step S32) print data other than a command is then detected (step S33 returns Yes), the print data is converted into the corresponding print buffer.

The printing control unit 6 sets the print buffer to which the converted data is written is set to the first-side print buffer 12 at this time because the active sheet selection unit 5 has selected the duplex printing process. As shown in FIG. 5, the print data [rstuvwxyz] received next from the host computer 20 is written to the first-side print buffer 12 (step S34). The cut command following the print data [rstuvwxyz] then triggers printing (step S36 returns Yes), and the print data [rstuvwxyz] is printed by the front print head 9 on the front side 301 of the roll paper (step S37). Because there is no print data in the second-side print buffer 13 at this time, data is only printed on the front side 301 by the front print head 9.

When the data interpretation unit 4 detects the cut command at the end of the print data D2 (step S38 returns Yes), the printing control unit 6 drives the cutting unit 11 to cut the roll paper 30 (step S39).

This aspect of the invention selects the front and back sides as the active sheet for duplex printing, and when the first-side print buffer 12 and second-side print buffer 13 both become full, the full buffer state triggers the duplex printing process. More specifically, duplex printing is not started when only the first-side print buffer 12 or the second-side print buffer 13 becomes full.

Therefore, if the print buffer is switched line by line as described in above, print data equal to one line to be printed on the front side 301 of the roll paper is written to the first-side print buffer 12, the data conversion area (buffer) is then changed, one line of print data to be printed on the back side 302 is written to the second-side print buffer 13, and printing starts when both the first-side print buffer 12 and the selected second-side print buffer 13 become full. Therefore, if the first-side print buffer 12 and second-side print buffer 13 each have capacity sufficient to store one line of print data, the duplex printing process can be executed line by line when the print buffers become full after converting a maximum of two lines of print data.

The printer 1 according to this embodiment of the invention thus switches the print buffer between the first-side print buffer 12 and second-side print buffer 13 each time a printing process selection command CA is received, and writes the print data to the corresponding print buffer. The print buffer to which the print data is converted and buffered can thus be switched using the printing process selection command CA. Therefore, when the front printing process for printing on the front side 301 of the roll paper is selected, the print data is written to the first-side print buffer 12, and when the back printing process for printing on the back side 302 is selected, the print buffer is switched to the second-side print buffer 13 for buffering the converted print data. When the front printing process for printing on the front side 301 is again selected, the conversion buffer is switched back to the first-side print buffer 12 and the print data is converted.

Furthermore, because the print buffer is switched line by line, the print buffer can be switched after writing print data for one line to be printed on the front side 301 is converted into the first-side print buffer 12 so that the print data to be printed on the back side 302 is then converted into the second-side print buffer 13. It is therefore not necessary to wait until all of the print data has been buffered in the front buffer and back buffer as is necessary with the related art, and the duplex printing process can start once at least one line of print data has been buffered to the first-side print buffer 12 and the second-side print buffer 13. Data throughput before printing starts can therefore be improved.

The start of printing can be triggered by a full buffer state or by a line feed command LF. The printing process can therefore be executed without waiting for the print buffer to become full by simply inserting a line feed command LF at the desired position in the print data. This enables printing with line feeds inserted at the number of lines desired by the user.

Embodiment 2

A second preferred embodiment of the invention is described next with reference to the accompanying figures.

Figure 6:
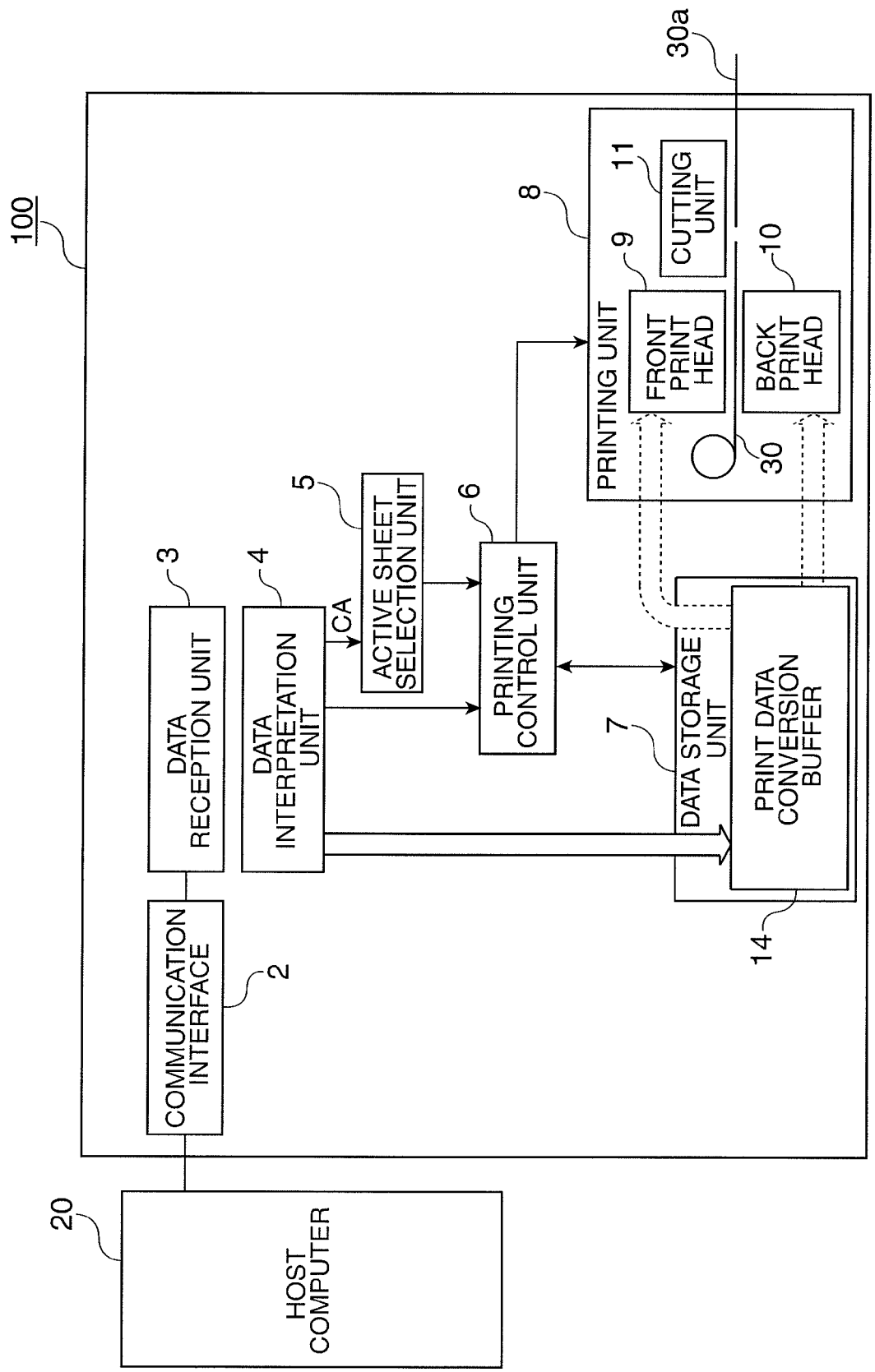
FIG. 6 is a schematic block diagram of a thermal printer according to a second embodiment of the invention.

FIG. 6 is a schematic block diagram of a thermal printer according to a second embodiment of the invention.

As shown in FIG. 6, a printer 100 according to this embodiment of the invention is a thermal printer that receives print data sent from a host computer 20 and prints on one side or both sides of a continuous recording medium (print medium) such as roll paper.

The major parts of a printer 100 according to this embodiment of the invention include a communication interface 2, a data reception unit 3, a data interpretation unit 4, an active sheet selection unit 5, a printing control unit 6, a data storage unit 7, and a printing unit 8.

The data reception unit 3 receives print data sent from a host computer 20 and inputs the received print data to the data interpretation unit 4. The data interpretation unit 4 then interprets the received print data, and if a printing process selection command CA (printing process selection instruction) is contained in the print data, inputs the command to the active sheet selection unit 5. If a cut command or line feed command, for example, is also found as a result of interpreting the print data, the detected command is input to the printing unit 8 through the printing control unit 6.

When the printing process selection command CA is input from the data interpretation unit 4, the active sheet selection unit 5 selects the specified printing process. More specifically, if the front side of the roll paper is set by the printing process selection command CA as the active sheet, a front printing process is selected. If the back side of the roll paper is roll paper is set as the active sheet, a back printing process is selected. If both the front and back sides of the roll paper are set as the active sheets, an identical front/back printing process.

An identical front/back printing process (identical duplex printing process) as used herein is a process for printing the same result on both the front side 301 (first side) and the back side 302 (second side) of the roll paper 30.

The printing control unit 6 controls the printing unit 8 to execute the printing process that is specified by the printing process selection command CA and selected by the active sheet selection unit 5. More specifically, when the identical front/back printing process is selected, the same content is printed simultaneously to the front and back sides of the roll paper 30 based on print data written to the print data conversion buffer 14 (data conversion area).

If the front printing process is selected, the simplex printing process is executed to print the front side of the roll paper 30 based on the print data written to the print data conversion buffer 14. If the back printing process is selected, the simplex printing process is executed to print the back side of the roll paper 30 based on the print data written to the print data conversion buffer 14.

When the print data conversion buffer 14 becomes full, the printing control unit 6 controls the printing unit 8 to start printing triggered by the full buffer state.

The data storage unit 7 is RAM or other type of volatile memory. The print data conversion buffer 14 is reserved in the data storage unit 7 and is the memory area where the print data is converted. If the result of data analysis by the data interpretation unit 4 is that print data other than a command is detected, the print data is converted into the print data conversion buffer 14.

Note that print data conversion buffer 14 in this embodiment of the invention has at least enough storage capacity to execute the front or back printing process (simplex printing process). If the printer is a line thermal printer, the capacity of the print data conversion buffer 14 is therefore enough to store at least one line. If the printing process executes continuously, the print data conversion buffer 14 has enough capacity to store at least two lines of print data.

The printing unit 8 prints on the roll paper 30 in either the simplex printing mode or duplex printing mode according to the command from the printing control unit 6. The printing unit 8 has two print heads disposed on opposite sides of the roll paper 30, and a cutting unit 11 for cutting the roll paper 30. The front print head 9 of the printing unit 8 prints on the front side 301 (first side) of the roll paper 30, and the back print head 10 prints on the back side 302 (second side) of the roll paper 30.

Both print heads 9 and 10 are line thermal print heads. When one line of the print head is printed, the roll paper 30 is advanced the distance equal to one line in the paper transportation direction X (see FIG. 3). Both sides of the roll paper 30 are printed simultaneously and continuously by repeating the operations of printing and advancing the paper one line at a time.

In the simplex printing mode, one of the print heads 9 and 10 is driven to print the corresponding side.

The roll paper 30 is thermal paper in this embodiment of the invention. The roll paper 30 is a web of paper wound into a tubular roll and is loaded into the printing unit 8 for use. When simplex printing or duplex printing on the roll paper 30 is completed, the printing control unit 6 controls the cutting unit 11 to cut the roll paper 30.

The printing process of the printer 100 according to this embodiment of the invention is described next.

When a printing process selection command CA is sent from the host computer 20, the active sheet selection unit 5 in this embodiment of the invention selects the specified printing process. The front printing process executed when the front of the roll paper is selected as the active sheet, the back printing process executed when the back of the roll paper is selected as the active sheet, and the identical front/back printing process executed when the front and back sides of the roll paper are selected as the active sheet are described below.

Front Printing Process and Back Printing Process

Figure 7:
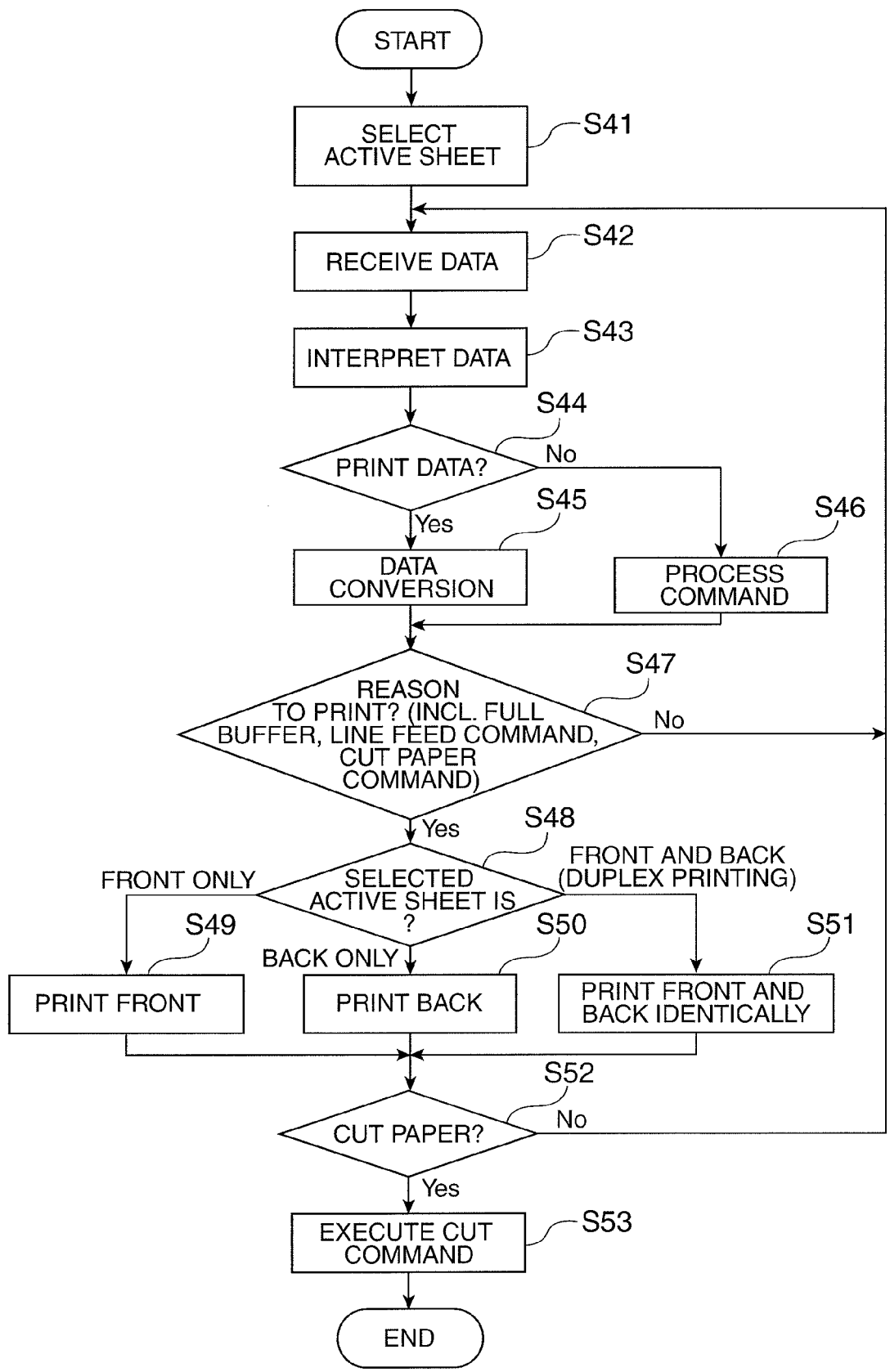
FIG. 7 is a flow chart describing the printing process executed by the thermal printer according the second embodiment of the invention.
Figure 8:
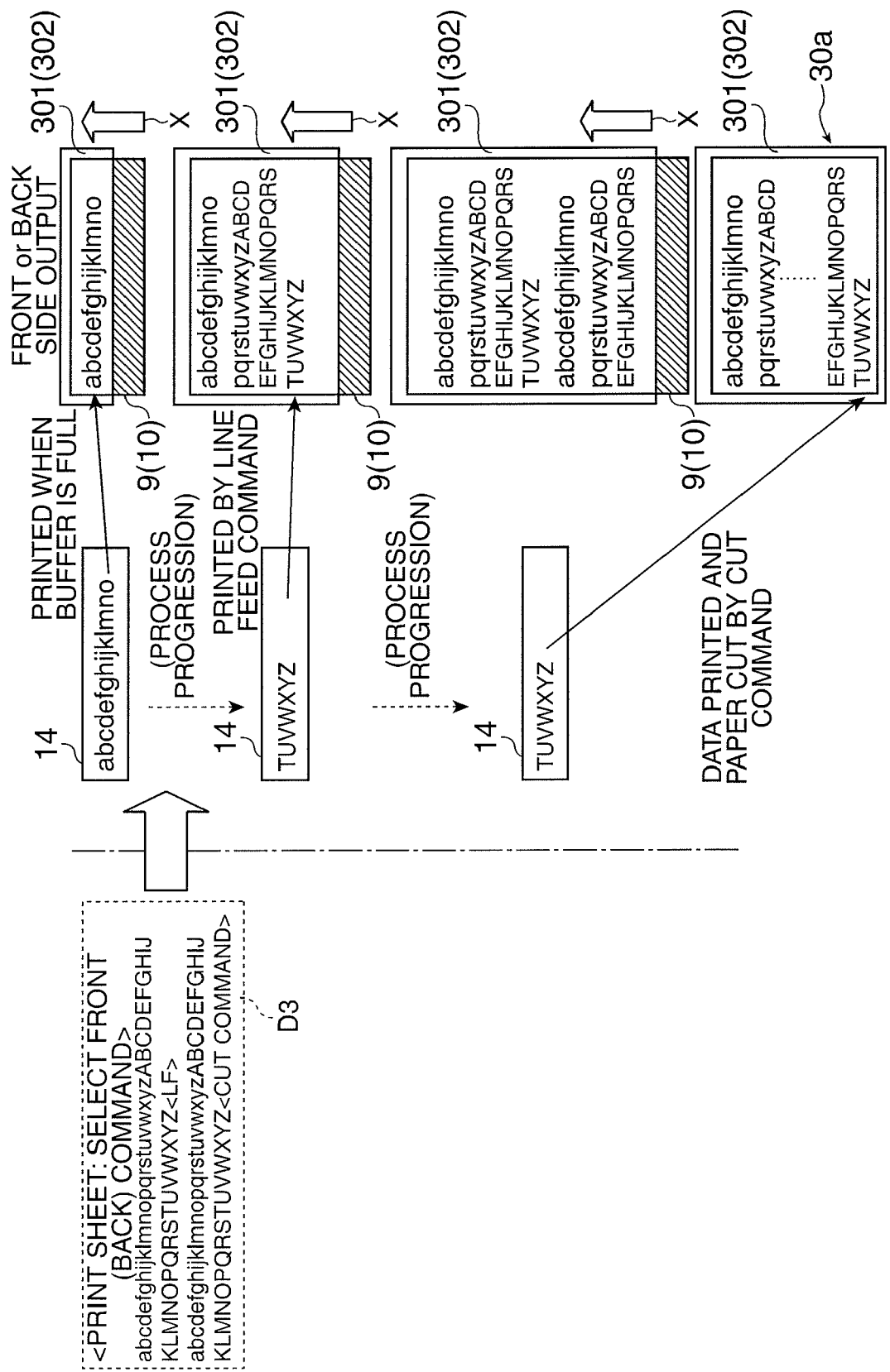
FIG. 8 schematically describes execution of the data conversion process and the printing process when the thermal printer according to the second embodiment executes the front or the back printing process.

FIG. 7 is a flow chart describing the printing process executed by the thermal printer according the second embodiment of the invention. FIG. 8 schematically describes execution of the data conversion process and the printing process when the thermal printer according to the second embodiment executes the front or the back printing process.

When the data reception unit 3 receives a printing process selection command CA from the host computer 20 and the data interpretation unit 4 interprets the printing process selection command CA, the command is input to the active sheet selection unit 5. The active sheet selection unit 5 then selects the active sheet specified in the printing process selection command CA (step S41). The front printing process is selected as the printing process at this time if the front side of the roll paper is selected as the active sheet, the back printing process is selected as the printing process if the back side of the roll paper is selected, and the identical front/back printing process is selected as the printing process if the front and back sides of the roll paper are selected.

When the data reception unit 3 receives print data D3 containing a printing process selection command CA from the host computer 20 (step S42), the data interpretation unit 4 interprets the print data D3 (step S43). If the data interpretation unit 4 detects print data other than a command as a result of interpreting the print data D3 (step S44 returns Yes), the data is converted and written to the print data conversion buffer 14 (step S45). As shown in FIG. 8, the print data [abcdef . . . ABCDEF . . . Z] sent from the host computer 20 is converted and stored in the print data conversion buffer 14. When the print data conversion buffer 14 becomes full, the full buffer state triggers printing (step S47 returns Yes), and the printing process starts. The printing control unit 6 controls execution of the printing process by the printing unit 8 based on the active sheet selected by the active sheet selection unit 5.

If the front side of the roll paper is selected (step S48: front), the printing control unit 6 drives the front print head 9 of the printing unit 8 to execute the front printing process (step S49), and the print data saved in the print data conversion buffer 14 ([abcdefghijklmno] in FIG. 8) is printed to the first line on the roll paper front 301.

If the back side of the roll paper is selected (step S48: back), the printing control unit 6 drives the back print head 10 of the printing unit 8 to execute the back printing process (step S50), and the print data saved in the print data conversion buffer 14 ([abcdefghijklmno] in FIG. 8) is printed to the first line on the roll paper back 302.

This data conversion and buffering process continues until the data interpretation unit 4 detects a cut command (step S52 returns No), and print data is buffered in the print data conversion buffer 14 until the next print opportunity is detected (step S47 returns No, step S45). As shown in FIG. 8, the front or back printing process is executed triggered by a full buffer state in the print data conversion buffer 14 until [abcdefghijklmno] is printed to the first line, [pqrstuvwxyzABCD] is printed on the second line, and [EFGHIJKLMNOPQRS] is printed on the third line. Because the print data D3 contains a line feed command LF after the print data [TUVWXYZ] to be printed on the fourth line, when the data interpretation unit 4 detects the line feed command (step S44 returns No), the line feed command causes the printing control unit 6 to insert a line feed in the print data conversion buffer 14 (step S46). Triggered by the line feed command, the printing control unit 6 then drives the front print head 9 (or back print head 10) to print the fourth line (step S47 returns Yes, step S48 returns front (or back), step S49 (or step S50)).

The data conversion process then repeats until the data interpretation unit 4 detects a cut command (step S52 returns No), and the print data is buffered to the print data conversion buffer 14 until the next print opportunity (step S47 returns No, step S45).

When the data interpretation unit 4 detects the cut command at the end of the print data D3 (step S44 returns No), the printing control unit 6 drives the front print head 9 (or back print head 10) triggered by the cut command to print the last line (step S47 returns Yes, step S48 returns front (or back), step S49 (or step S50)).

When the printing process ends, the printing control unit 6 cuts the roll paper 30 based on the cut command (step S52 returns Yes, step S53), resulting in the roll paper printout 30a printed on one side.

Identical Front/Back Printing Process

The identical front/back printing process is described next with reference to FIG. 7 and FIG. 9.

Figure 9:
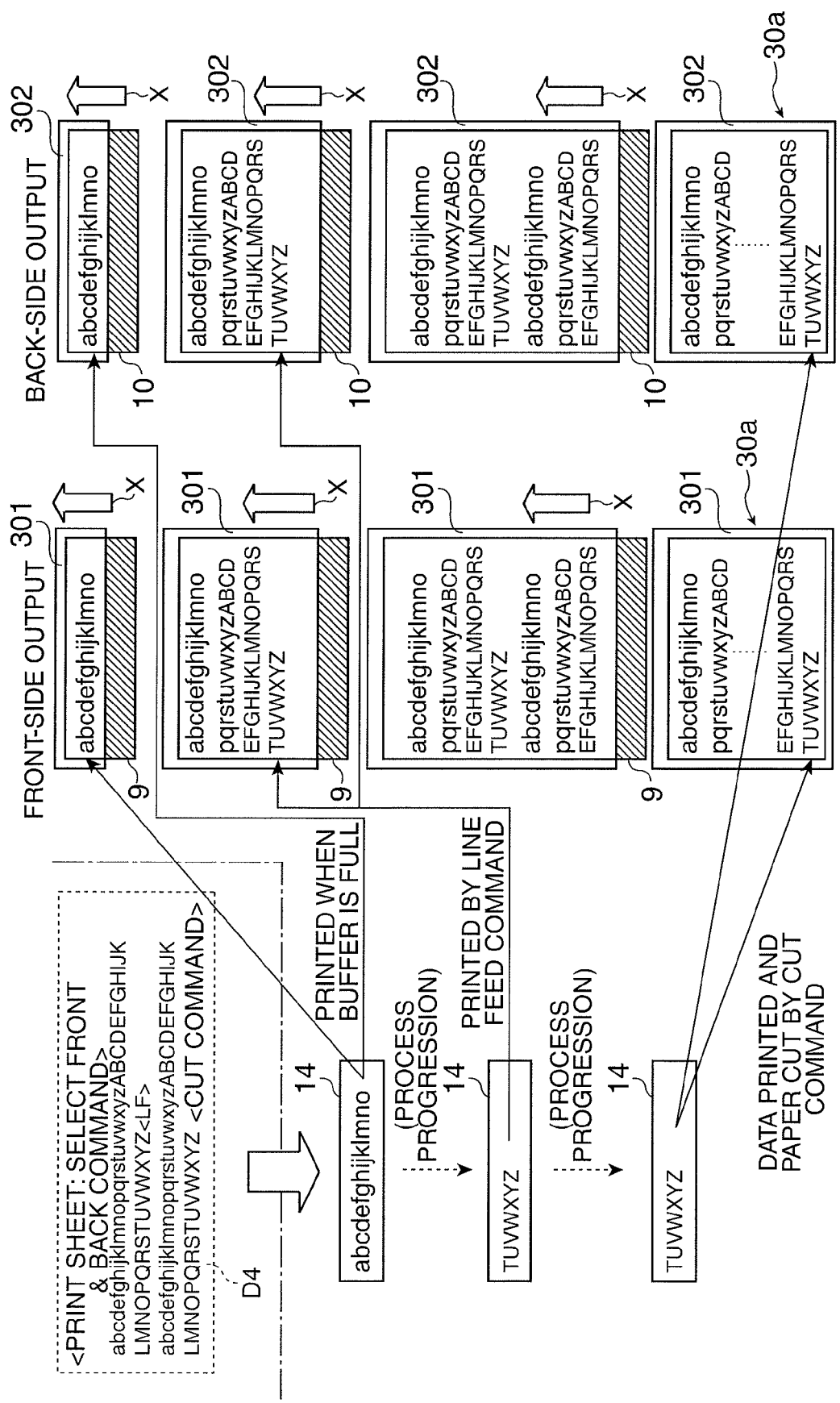
FIG. 9 schematically describes execution of the data conversion process and the printing process when the thermal printer according to the second embodiment prints the same content to both front and back sides.

FIG. 9 schematically describes execution of the data conversion process and the printing process when the thermal printer according to the second embodiment prints the same content to both front and back sides.

When the data reception unit 3 receives a printing process selection command CA from the host computer 20 and the data interpretation unit 4 interprets the printing process selection command CA, the command is input to the active sheet selection unit 5. The active sheet selection unit 5 then selects the active sheet specified in the printing process selection command CA (step S41). As noted above, when the front and back sides of the roll paper are selected, the identical front/back printing process is selected as the printing process.

When the data reception unit 3 receives print data D4 containing a printing process selection command CA from the host computer 20 (step S42), the data interpretation unit 4 interprets the print data D4 (step S43). If the data interpretation unit 4 detects print data other than a command as a result of interpreting the print data D4 (step S44 returns Yes), the data is converted and written to the print data conversion buffer 14 (step S45). As shown in FIG. 9, the print data [abcdef . . . ABCDEF . . . Z] sent from the host computer 20 is converted and stored in the print data conversion buffer 14. When the print data conversion buffer 14 becomes full, the full buffer state triggers printing (step S47 returns Yes), and the printing process starts. The printing control unit 6 controls execution of the printing process by the printing unit 8 based on the active sheet selected by the active sheet selection unit 5.

Because the front and back sides of the roll paper are selected in this instance (step S48: front and back), the printing control unit 6 drives the front print head 9 and the back print head 10 of the printing unit 8 to execute the identical front/back printing process (step S51). The print data saved in the print data conversion buffer 14 ([abcdefghijklmno] in FIG. 9) is printed to the first line on the roll paper front 301 by the front print head 9, and the same print data as the front side print data ([abcdefghijklmno]) written to the print data conversion buffer 14 is printed to the first line of the back side 302 by the back print head 10.

This data conversion and buffering process continues until the data interpretation unit 4 detects a cut command (step S52 returns No), and print data is buffered in the print data conversion buffer 14 until the next print opportunity is detected (step S47 returns No, step S45). As shown in FIG. 9, the identical front/back printing process is executed triggered by a full buffer state in the print data conversion buffer 14 until [abcdefghijklmno] is printed to the first line, [pqrstuvwxyzABCD] is printed on the second line, and [EFGHIJKLMNOPQRS] is printed on the third line. Because the print data D3 contains a line feed command LF after the print data [TUVWXYZ] to be printed on the fourth line, when the data interpretation unit 4 detects the line feed command (step S44 returns No), the line feed command causes the printing control unit 6 to insert a line feed in the print data conversion buffer 14 (step S46). Triggered by the line feed command, the printing control unit 6 then drives the front print head 9 and back print head 10 to print the fourth line (step S47 returns Yes, step S48 returns front and back), step S51).

The data conversion process then repeats until the data interpretation unit 4 detects a cut command (step S52 returns No), and the print data is buffered to the print data conversion buffer 14 until the next print opportunity (step S47 returns No, step S45).

When the data interpretation unit 4 detects the cut command at the end of the print data D3 (step S44 returns No), the printing control unit 6 drives the front print head 9 and back print head 10 triggered by the cut command to print the last line (step S47 returns Yes, step S48 returns front and back, step S51).

When the printing process ends, the printing control unit 6 cuts the roll paper 30 based on the cut command (step S52 returns Yes, step S53), resulting in the roll paper printout 30a printed on both sides.

As described above, the printer 100 according to this embodiment of the invention can execute a simplex printing process on the front side of the roll paper 30, a simplex printing process on the back side of the roll paper 30, or an identical front/back duplex printing process on the front and back sides of the roll paper 30 in response to the printing process selection command CA, which may be a front-side selection command, a back-side selection command, or a front and back side selection command. A simplex printing process and identical front/back duplex printing process can therefore be selected and executed at will.

Furthermore, when the identical front/back printing process is selected, duplex printing is executed based on the data written to the print data conversion buffer 14. The storage capacity of the print data conversion buffer 14 is the capacity required to execute the simplex printing process. More specifically, the roll paper can be printed on one side or both sides without increasing the capacity of the data buffer of a thermal printer that can execute only a simplex printing process.

When it is desirable to print the same content on both front and back sides, the invention does not need to write the print data to both the front print buffer and the back print buffer, and can output the same content on both front and back sides based on the data written to the print data conversion buffer 14. A smaller print data conversion buffer 14 can therefore be used, the print data conversion time can be shortened, and throughput before printing starts can be increased.

When the identical front/back printing process is selected, the same content is printed simultaneously to both front and back sides of the medium. Because the same content can thus be printed simultaneously to both sides while using a smaller print data conversion buffer 14, a printing speed at least equal to that of the related art can be maintained. Furthermore, when printing on the front side or printing on the back side is specified, the print data written to the print data conversion buffer 14 is printed in a simplex printing mode to the front or back side. A single print data conversion buffer 14 can thus be used for both a front printing process and back printing process, and it is not necessary for the printer to have both a front print buffer and back print buffer as is required by the related art.

The thermal printer 100 according to this embodiment of the invention starts the printing process when the print data conversion buffer 14 becomes full. As noted above, the storage capacity of the print data conversion buffer 14 is the capacity required to execute the simplex printing process. The printing process can therefore be triggered by events occurring at at least the same interval as in the simplex printing process. The thermal printer according to the invention can therefore operate in a simplex printing mode or a duplex printing mode at at least the same printing speed enabled by a simplex printing process according to the related art.

A thermal printer is described in the first and second embodiments above as an example of a printer according to the present invention, but the invention is not so limited. More particularly, the invention can also be applied to an inkjet printer or a dot impact printer.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer for executing a printing process on one side or both sides of a print medium, comprising:
   a data conversion area having sufficient storage capacity to execute a printing process on at least one side of the print medium;
   a reception unit that receives a print data and a printing process selection command specifying execution of
      a simplex printing process that prints the print data written to the data conversion area to a first side of the print medium,
      a simplex printing process that prints the print data written to the data conversion area to a second side of the print medium,
      a duplex printing process that prints the print data written to the data conversion area to the first side and the second side of the print medium, wherein a portion of the print data is printed to the first side and a different portion of the print data is printed to the second side, and
      a duplex printing process that prints the print data written to the data conversion area to the first side and the second side of the print medium, wherein the print data is printed to the first side and the same print data is printed to the second side, wherein the capacity of the data conversion area used in each of the duplex printing processes and simplex printing processes is the same; and
   a printing control unit that executes the printing process specified by the printing process selection command;
   wherein the data conversion area includes a first data conversion area to which the print data printed on the first side is buffered, and a second data conversion area to which the print data printed on the second side is buffered;
   wherein the printing control unit changes the data conversion area and converts the print data according to each printing process selection command, and executes the duplex printing process based on the print data written to the first data conversion area and second data conversion area when triggered by a print opportunity; and
   wherein the printing control unit:
      sets the data conversion area to the first data conversion area for print data conversion when a simplex printing process on the first side is selected,
      sets the data conversion area to the second data conversion area for print data conversion when a simplex printing process on the second side is selected, and
      executes the duplex printing process triggered by a full buffer state as the print opportunity when the data conversion area corresponding to the side selected by the printing process selection command becomes full.

2. The printer described in claim 1, wherein:
the printing control unit
   writes print data to the first data conversion area and the second data conversion area when the duplex printing process is selected, and
   executes the duplex printing process triggered by a full buffer state as the print opportunity when the data conversion area including both the first data conversion area and the second data conversion area becomes full.

3. The printer described in claim 1, wherein:
the printing control unit executes the duplex printing process triggered by a line feed command specifying changing the line on which the print data is printed as the print opportunity.

4. The printer described in claim 1, wherein:
the printing control unit simultaneously prints identical content to the first side and the second side based on the print data written to the data conversion area when the identical front/back printing process is specified,
simplex prints to the first side based on the print data written to the data conversion area when the simplex printing process on the first side is specified, and
simplex prints to the second side based on the print data written to the data conversion area when the simplex printing process on the second side is specified.

5. The printer described in claim 4, wherein:
the printing control unit starts the printing process when the storage capacity of the data conversion area becomes full.

6. The printer described in claim 1, wherein the data conversion area used in each of the simplex and duplex processes requires only enough capacity to execute a simplex printing process such that a printing speed of each of the duplex processes is at least equal to a printing speed of each of the simplex processes.

7. The printer described in claim 1, wherein the data conversion area requires only enough capacity to store two lines of print data in order to print continuously in each of the simplex and duplex processes.

8. The printer described in claim 1, wherein the printer further comprises:
   a data interpretation unit that detects the printing process selection command; and
   an active sheet selection unit that receives the printing process selection command from the data interpretation unit, wherein the active sheet selection selects an active sheet side so that:

print data buffered on the data conversion area prints to the first side in response to selection of the first side simplex process, print data buffered on the data conversion area prints to the second side in response to selection of the second side simplex process; and print data buffered on the data conversion area prints to the first and second sides in response to selection of either of the duplex processes.

* * * * *